United States Patent [19]
Binder et al.

[11] 4,295,067
[45] Oct. 13, 1981

[54] COOLING APPARATUS FOR ELECTRICAL MACHINERY

[75] Inventors: Georg Binder, Bechhofen; Günter Wössner, Esslingen, both of Fed. Rep. of Germany

[73] Assignee: Robert Bosch GmbH, Stuttgart, Fed. Rep. of Germany

[21] Appl. No.: 10,049

[22] Filed: Feb. 7, 1979

[30] Foreign Application Priority Data

Mar. 9, 1978 [DE] Fed. Rep. of Germany ....... 2810222

[51] Int. Cl.³ .............................................. H02K 9/00
[52] U.S. Cl. ....................................... 310/52; 310/58; 310/64; 165/104.26 R
[58] Field of Search ........................ 310/52, 53, 89, 54, 310/55, 284, 57, 58, 59, 64, 65, 68 D, 68 R, 263; 165/105

[56] References Cited

U.S. PATENT DOCUMENTS

| | | | |
|---|---|---|---|
| 1,700,840 | 2/1929 | Gay | 310/54 |
| 3,801,843 | 4/1974 | Corman | 310/58 |
| 3,863,127 | 1/1975 | Raver | 310/68 D |
| 4,162,419 | 7/1979 | De Angelis | 310/68 D |

FOREIGN PATENT DOCUMENTS

964711  3/1975  Canada ................................. 310/53

*Primary Examiner*—R. Skudy
*Attorney, Agent, or Firm*—Frishauf, Holtz, Goodman & Woodward

[57] ABSTRACT

In order to provide improved cooling for electrical machinery, especially A. C. generators for motor vehicles, with elimination of a rotating ventilating fan, the invention provides heat pipes disposed so that the evaporation regions of the heat pipes contact or surround the heat-producing parts of the generator, in particular the stator windings and the rectifying diodes. These regions communicate through sealed conduits with condensation regions that are located in places subject to lower temperatures that prevail near the heat producing elements. Disposed within the heat pipes are per se known capillary structures which transport condensed heat transport medium back to the evaporation region. Various embodiments are presented.

12 Claims, 14 Drawing Figures

COOLING APPARATUS FOR ELECTRICAL MACHINERY

FIELD OF THE INVENTION

The invention relates to cooling of electrical machinery, and more particularly to cooling of A.C. generators in motor vehicles.

BACKGROUND OF THE INVENTION

It is known to cool electrical machinery, for example A.C. generators in motor vehicles, by use of fans or other ventilators, preferably attached directly to the rotor shaft of the generator. The fans may be mounted within the housing of the generator or externally thereof and serve to generate a substantially axial air flow through the electrical machinery. Cooling a generator or other electrical machinery by means of an axially air transporting fan has several disadvantages. The power required to drive the fan increases non-linearly with increasing speed and this power drain is present even if no cooling is required; the air transported by the fan generally carries contaminants, dust and the like, which may accumulate within the generator and tend to diminish the cooling efficiency; the rotating fan generates substantial noise and may also serve as a diaphragm for transmitting noise generated by axial oscillations of the generator shaft.

The rotating cooling fan in the known apparatus must be so dimensioned that is can supply adequate cooling even when the outside air temperature is extremely high and the A.C. generator is subjected to its heaviest load. Accordingly, either the fan power, or the generator must be adequate for these maximum conditions. The interior of the generator must contain air guide channels that pass in the vicinity of those parts of the generator that produce the most heat. All of these efforts increase the cost and decrease the efficiency of which the A.C. generator is inherently capable. Encapsulated generators present even more difficult cooling problems.

It is known in many areas of technology to transport heat also for the purpose of cooling, by the use of heat pipes which are inherently capable of transporting substantial amounts of heat from one location to another. A heat pipe of known construction has a partial region extending into a cool zone; its interior contains a heat carrier, for example an evaporable transport medium or coolant which is heated in the region where heat is generated to a degree that it will evaporate. Its vapor will migrate within the heat pipe to the cooler region. In the cooler region, the coolant condenses, after which it is transported back into the evaporation region due to the capillary forces. The maximum heat transport capability of such heat pipes is determined by the strength of the capillary forces and by the pressure drops of the vapor flow and the liquid flow.

It is known to use heat pipes for cooling thyristors, for example as described in Brown Boveri Company (BBC) News, 1973, Vol. 6/7, Page 143ff.

THE INVENTION

It is a principal object of the present invention to provide a cooling apparatus, especially for cooling electrical machinery, which is not subject to the aforementioned disadvantages of forced air cooling; and an alternator which has the further advantage that its total efficiency is substantially higher than is possible with direct air flow.

Briefly, the rotating air transporting fan apparatus is eliminated; instead in the vicinity of heat producing parts of the machinery hollow spaces are formed which serve as evaporation regions of a heat pipe system, the evaporation regions communicating with further hollow spaces that define condensation regions of the heat pipe system, located in regions which are not directly subject to heating. It is an advantageous feature of the invention that the elimination of the rotating fan substantially reduces the power requirements of an A.C. generator in a motor vehicle. For example, in an engine rotating at 6000 rpm, it is possible to effect a savings of approximately 1 to 2 hp which results in fuel savings or increased engine torque.

A further substantial advantage of the invention is that all problems which arise when encapsulated, i.e., dust-protected, generators must be cooled, are automatically eliminated. Encapsulated and dust-proof generators do not have air guide channels and other openings for the passage of air and elimination of heat produced during operation so that heretofore such generators had to be over-dimensioned or had to be cooled by very complicated mechanisms.

In a preferred feature of the invention, suitable cooling members, for example cooling ribs, are disposed in conjunction with the condensation region of the hollow spaces which define the condensation region so that an intensive heat exchange can take place. The transfer of heat from the generator begins when the boiling point of the transport medium is reached and this point may be selected by suitable choice of the coolant medium. Once evaporation of the coolant has begun, the heat transport proceeds automatically. It is possible to extend the heat pipe and to dispose the condensation region including cooling ribs and other enhancement structures far away from the heat generating machinery, i.e., the A.C. or D.C. generator. In motor vehicles, the condensation region may be disposed advantageously in the air stream required to cool the engine.

In one advantageous feature of the invention, the hollow structures which constitute the evaporation region of the heat pipe are cylindrical shells disposed immediately adjacent to the stator windings of the generator.

Other features and advantages will emerge from the following detailed description of exemplary embodiments of the invention.

DETAILED DESCRIPTION OF THE EXEMPLARY EMBODIMENTS

Preliminary Considerations

The cooling apparatus to be described in detail below is usable for cooling any type of electrical machinery. Accordingly, the description below, which relates to the use of the invention for cooling an A.C. generator, is to be regarded as exemplary and non-limiting.

The basic principle underlying the present invention is that electrical machinery, and especially A.C. or D.C. generators, develop substantial heat in stator or field windings and in the vicinity of the rectifiers and that this heat is transported from these regions by the use of heat pipe structures which, by themselves, are known. By placing a part of the heat pipe structure in or near the stator or field windings and the condensation part of the heat pipe in a relatively cool area, the known principle of evaporation cooling results in the removal of heat from the stator windings and hence a control of the temperature thereof. A similar principle is used for transporting heat from the rectifying diodes of the generator. The transfer of heat from the evaporation zone to the condensation zone is effected by the coolant vapor at substantially constant temperature along the heat pipe. In the condensation zone, the vaporized coolant condenses and is transported back to the evaporation region by means of a capillary structure within the heat pipe. The back transport of the coolant requires no external forces and takes place entirely under the influence of capillary forces.

The cooling system according to the present invention permits the removal of substantial amounts of heat from a generator to a heat sink which may be located remote from the generator. Furthermore, it makes possible the use of large heat transfer surfaces and permits effective cooling even of high-temperature heat sources to ambient heat sinks which are also at elevated temperature.

DESCRIPTION OF EMBODIMENTS

Figure 1:
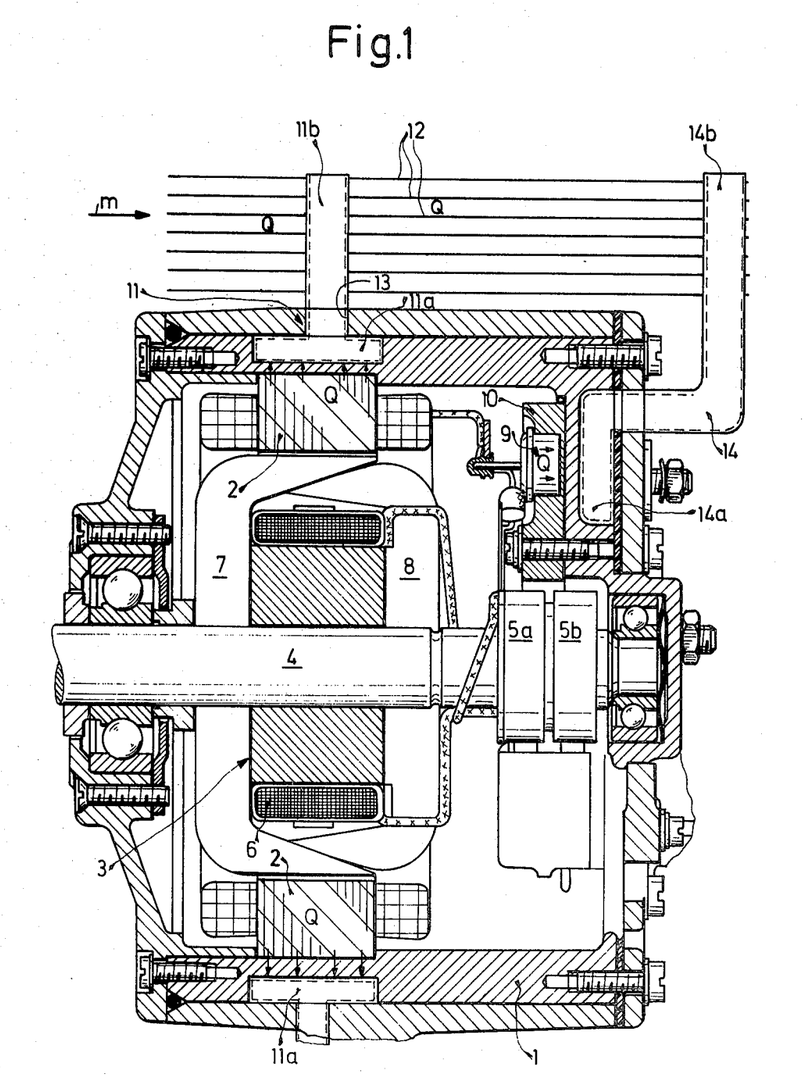
FIG. 1 is a partially sectional side view of an A.C. generator including stator windings and rectifying diodes which cooled by a structure according to the invention.

FIG. 1 is a sectional side view of a claw pole A.C. generator. Located within a surrounding housing 1 is a three-phase stator or armature winding 2 and a rotor 3 whose shaft 4 also carries slip rings 5a, 5b which serve to carry direct current to the exciter or field windings 6 mounted on the rotor. The alternating magnetic field is attained by the claw pole structure 7, 8 which has interleaving claws so that alternating magnetic poles are defined along the circumference of the rotor. The alternating current induced in the armature windings 2 is conducted to rectifiers 9. A three-phase A.C. generator must include a plurality of rectifying diodes inasmuch as three currents which are mutually displaced by 120° have to be rectified separately. For this purpose, there are provided six power diodes, i.e., three positive diodes and three negative diodes. Also provided are three exciter diodes which feed the required exciter current to the rotating field winding 6 via a voltage regulator, not shown. For substantial electrical loads, the power diodes generate a large amount of heat which would result in their destruction unless they are cooled very effectively. The diodes 9 are disposed and mounted on a cooling plate 10.

Figure 2:
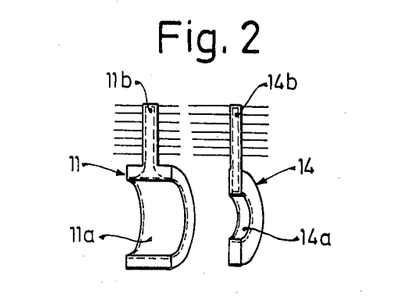
FIG. 2 is a perspective drawing of the form which the heat pipes may take.

FIG. 1 further illustrates a first embodiment of a cooling apparatus according to the invention based on the principle of the heat pipe. The evaporation region 11a of a heat pipe 11 is embodied as a cylindrical shell whose perspective view is illustrated in FIG. 2. Radially extending from the cylindrical shell 11a is the condensation region 11b which may be provided with external cooling ribs 12 for more intensive heat transfer to the surrounding air. The capillary structure 13 which causes the transport of the coolant back to the evaporation region is illustrated by dashed lines. The capillary structure 13 is contained entirely within the sealed heat pipe 11. The cylindrical shell 11a of the evaporation region of the heat pipe completely surrounds the stator windings of the generator and the amount of heat generated in the windings 2 results in the evaporation of the heat transport medium within the heat pipe. The vapor of the medium then migrates to the condensation region 11b and condenses and the heat of evaporation is transmitted to the cooling fins 12 from which it is carried away by the surrounding air flow.

A similar process takes place in the vicinity of the power diodes 9 where the diode-cooling heat pipe 14 has an evaporation region 14a, substantially in the form of an annular channel, which is attached to the holding plate 10 so that the heat generated by the diodes is transmitted thereto and is transported away by the heat pipe to the vicinity of the cooling ribs 12. The condensation region 14b of the heat pipe 14 may be served by the same cooling ribs which also cool the condensation region 11b of the stator heat pipe 11. The basic principle of cooling the windings and rectifying elements of the generator as illustrated in FIG. 1 is subject to many variations for adaptation to different types of heat-producing components of electrical machinery. Some of the variants for cooling the stator windings are illustrated in FIGS. 3–8.

Figure 3:
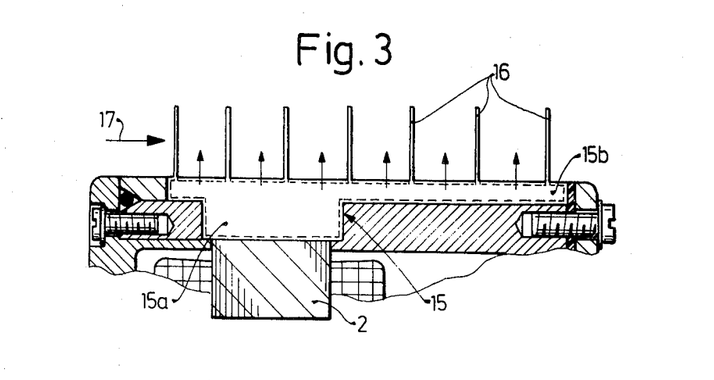
FIG. 3 is a first exemplary embodiment of a cooling apparatus associated with the stator windings of the generator and having external cooling ribs.

FIG. 3 is a sectional illustration of a part of the A.C. generator of FIG. 1 including a heat pipe 15 whose evaporation region 15a is located adjacent to the field windings 2 and which has the shape of a cylindrical shell. At certain points in the circumference of the shell, the latter is extended into a condensation pipe 15b substantially extending over the length of the A.C. generator and the part 15b may be disposed within the generator housing wall. Attached to the tube 15b are cooling ribs 16 which may be integral therewith. When the cooling ribs extend axially, the air flow may follow the direction of the arrow 17 whereas, with the radial cooling fins as shown in FIG. 3, the air flow would advantageously be in the direction of the extent of the cooling ribs, i.e., around the generator housing.

Figure 4:
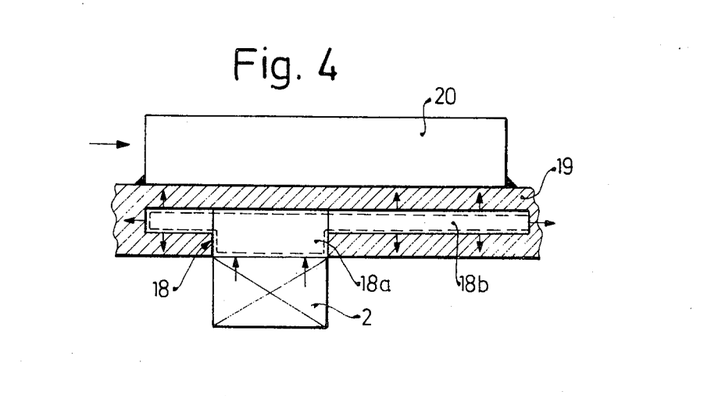
FIG. 4 is a second exemplary form of a stator cooling apparatus.
Figure 5:
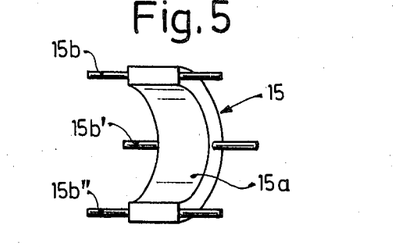
FIG. 5 is a perspective illustration of the shape of the heat pipe associated with the stator windings.

FIG. 5 is a perspective illustration of the heat pipe of FIG. 3 and shows the lateral tubes 15b, 15b' and 15b" which constitute the condensation region. A variant of the heat pipe structure of FIG. 3 is illustrated in FIG. 4 in which it is shown to be entirely included within the wall 19 of the generator housing as a single hollow structure with an evaporation region 18a which extends radially toward the field windings 2. The remainder of the heat pipe 18 may consist of individual tubes, substantially as shown in FIG. 5 or may be a surrounding cylindrical structure 18b disposed within the wall of the housing which transmits the liberated heat of condensation to its surroundings as shown by the small arrows. To aid in the dispersal of heat, radial or, as illustrated in FIG. 4 axially extending cooling ribs 20 may be attached to the housing.

Figure 6:
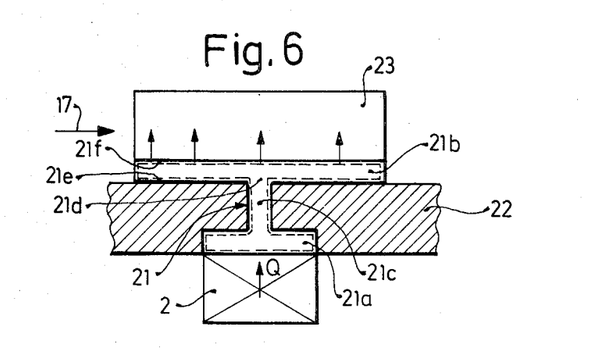
FIG. 6 is an alternative embodiment of a two-part heat pipe for the stator windings.

Several heat pipes may be combined into a heat pipe system. FIG. 6 illustrates a construction consisting of two heat pipes 21 and 21b. The heat pipe 21b extends entirely from the housing 22 of the generator and may have axially tube elements, for example as shown in FIG. 5, or may be a cylindrical annulus surrounding the housing. The principal evaporation region 21a connects to an intermediate region 21c lying between the wall 22 and the condensation region 21d. The heat received from the stator windings 2 is transported from the condensation region 21d of the first heat pipe to the evaporation region 21e of the second heat pipe and from there to the condensation region 21f of the second heat pipe. Radial or longitudinal cooling ribs 23 may be used to aid in the removal of heat to the air stream 17.

Figure 7:
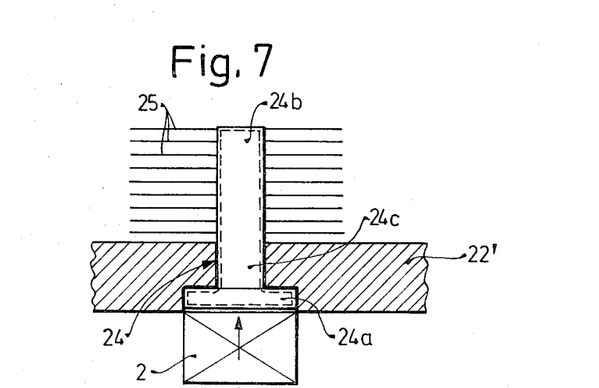
FIG. 7 is a further embodiment of a heat pipe for the stator windings.

FIG. 7 is an illustration of a heat pipe in which the condensation region of a heat pipe 24 is constructed as one or more tubes 24b which are extensions of the tubes 24c that extend from the cylindrical evaporation region 24a. Surrounding the condensation region 24b may be a system of cooling ribs 25 of any suitable construction. The tubes 24c may penetrate the wall of the housing at any suitable location. However, the structure 24c may also be a radial annular channel in which case the condensation region 24b may also be similarly constructed.

Figure 8:
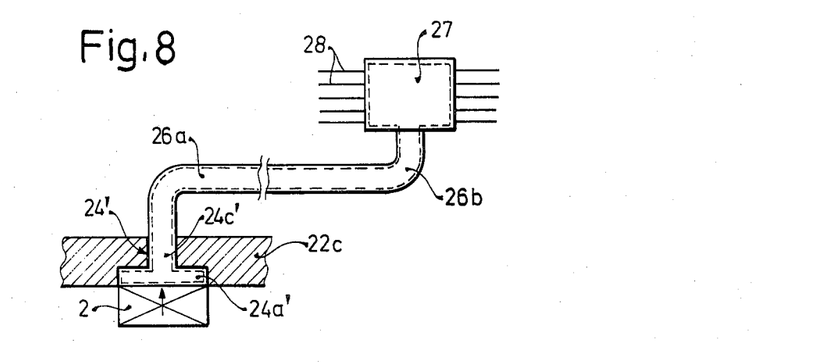
FIG. 8 is an example of the heat pipe with a remotely located condensation region.

The variant embodiment illustrated in FIG. 8 is different from that of FIG. 7 only by the extension of the intermediate heat pipe region 24c' with the inclusion of optional bends 26a and 26b and final termination in a condensation region 27 which can be located and in any suitable location may be equipped with air fins 28. This type of construction is especially suitable for the removal of heat from an electrical generator that is sealed and encapsulated for protection against contamination. In such a case the condensation element can be disposed within the intensive air flow regions of the motor vehicle either within the engine compartment or exposed to the airstream. It is a significant advantage of the construction illustrated in FIG. 8 that, even when the condensation region 27 is in a completely different location than the generator, no mechanical pumps are required and all of the heat flow is affected by the internal flows within the heat pipe, i.e., by the migration of coolant vapor to the condensation region and the return migration of liquid coolant via capillary structures.

Figures 9, 10:
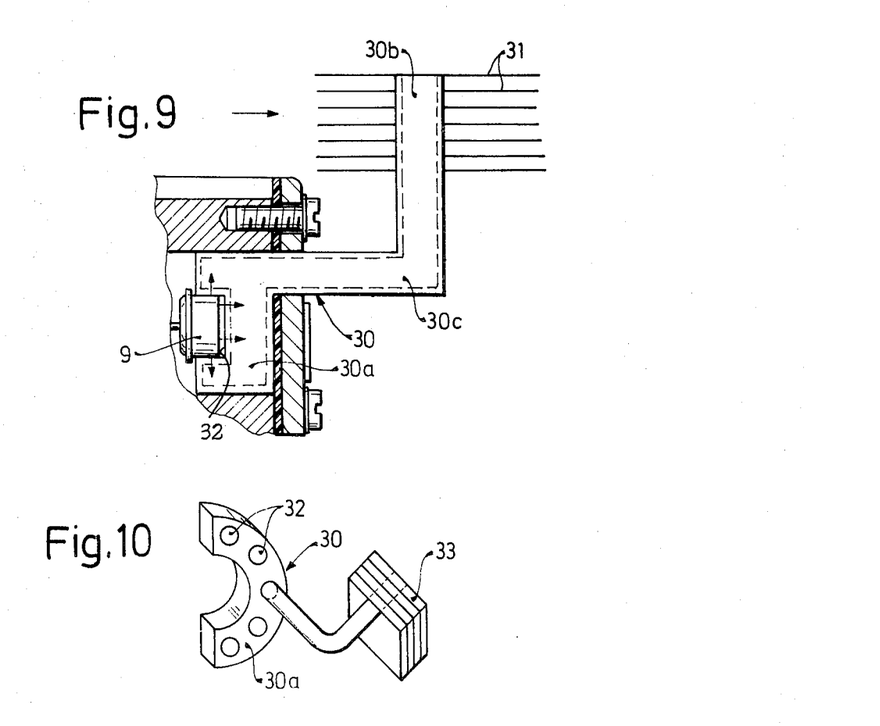
FIG. 9 is a first exemplary embodiment of a heat pipe for cooling the rectifying diodes in an A.C. generator.
FIG. 10 is a perspective illustration of the shape of the diode cooling heat pipe.

FIG. 9 is an illustration of one embodiment of a heat pipe for cooling a typical power diode 9. The heat pipe 30 has an evaporation region 30a with a well-like recess 32 in which the cylindrical part of the diode 9 extends resulting in an intensive transfer of heat from the diode 9 to the region 30a. The vaporized coolant travels through a transition region 30c to a condensation region 30b on which are mounted external cooling fins 31. A part of the transition tube 30c extends from the annular structure 30a in a basically axial direction outside of the housing and is then bent into a radial direction such that the condensation region 30b is located in the air stream surrounding the housing of the generator. FIG. 10 is a perspective view of the heat pipe structure illustrating the depressions 32 for receiving the various power diodes 9. The cooling structure 33 is seen to surround the condensation region of the heat pipe 30.

Figure 11:
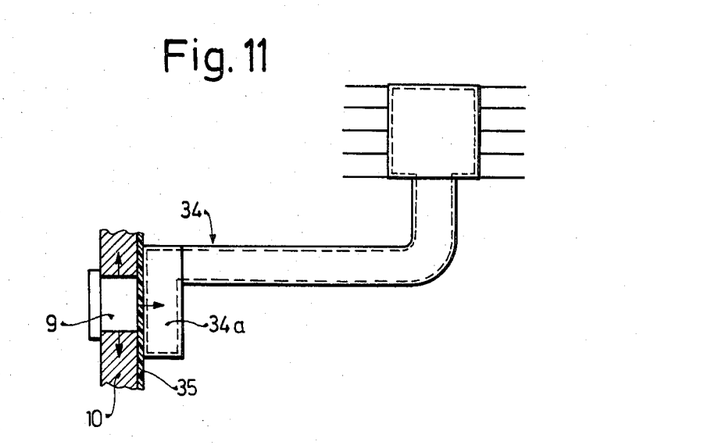
FIG. 11 is an alternative construction of the diode cooling heat pipe.

As illustrated in FIG. 11, the diode 9 may also remain located within its holding plate 10, especially if electrical insulation is required between the housing of the diode and the heat pipe 34. The heat then flows through the insulating layer 35 to the evaporation region 34a of the heat pipe.

Figure 12:
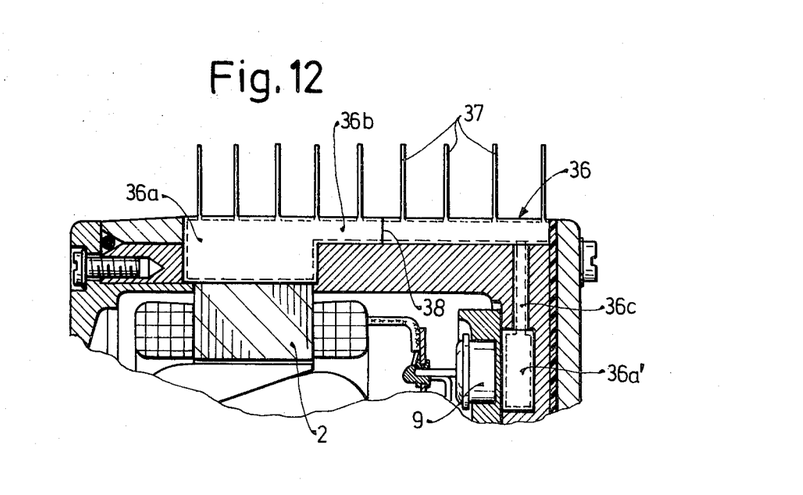
FIGS. 12–14 are different embodiments of heat pipes for simultaneous cooling of the stator windings and the rectifying diodes in an A.C. generator.

FIG. 12 is an illustration of an embodiment of the invention for simultaneous cooling of the stator windings and the power diodes. A heat pipe 36 includes an outer condensation region 36b and immediately adjacent thereto an evaporation region 36a serving to cool the stator windings 2. An annular evaporation region 36a' serves to cool the diodes 9 and is connected to the condensation region 36b via a transition tube 36c. Cooling ribs 37 may be attached to the condensation region 36b. The condensation region 36b may be located in recesses, for example grooves or cylindrical depressions of the outer wall of the housing of the generator but may also be attached externally thereof. The internal communications between the two heat pipes may be interrupted, for example, by an internal wall 38.

Figure 13:
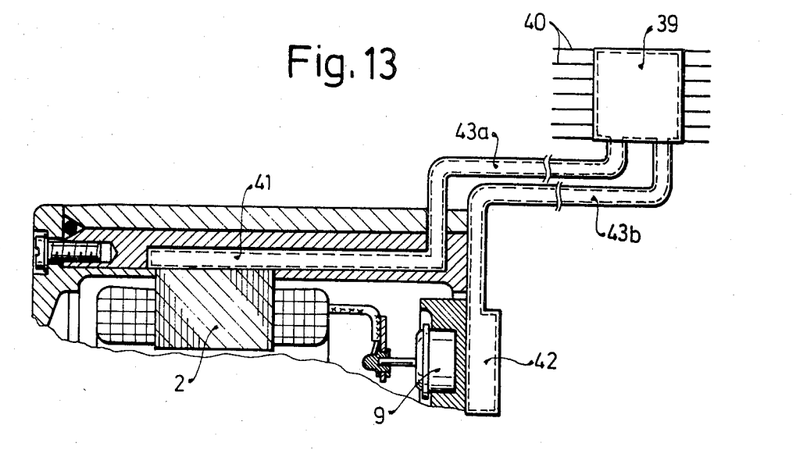

FIG. 13 is an illustration of another common cooling apparatus for the stator windings 2 and the power diodes 9. A cylindrical shell 41 serves to cool the stator windings 2 and a radial annulus 42 serves to cool the diodes 9. Tubes 43a, 43b which may extend over substantial distances, connect the evaporation regions with condensation regions in a condenser section 39 which may be provided with cooling fins 40.

Figure 14:
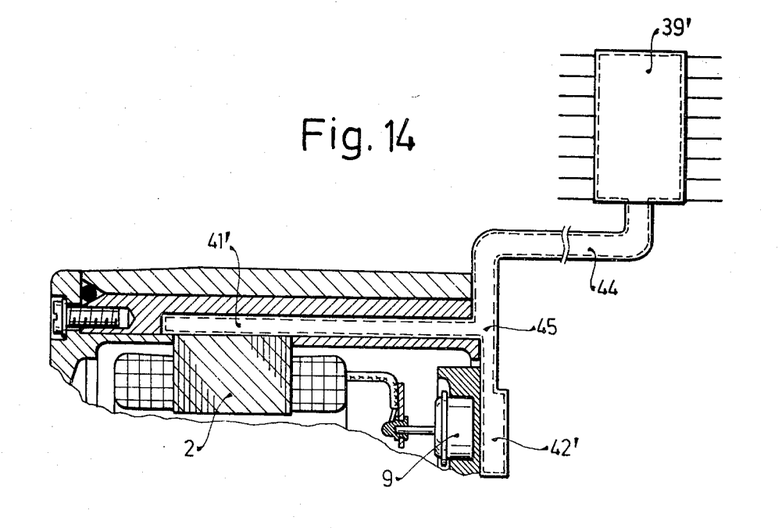

FIG. 14 illustrates a variant of the construction of FIG. 13 in which a common transition tube 44 is used for both the evaporation regions 41' and 42'. The tube 44 may suitably be joined at the junction 45 of the two evaporation regions.

The rotating field of electrical generators normally does not require external cooling because the rotor windings do not generate substantial amounts of heat, and because there is available a first heat transport mechanism by conduction through the rotor shaft and a second transport mechanism due to the air flow generated by the rotor itself. Thus, only the stator windings and the power diodes have to be cooled which may be performed effectively in the manner illustrated by means of the present invention, and the normally required air fan may be completely dispensed with. The absence of the air fan results in a reduction of the required power by approximately 30 percent which, at speeds of 6000 rpm, may result in a power savings of approximately 1.4 hp. Furthermore, the degree and efficiency of cooling of the windings and of the diodes is substantially improved making it possible to get a higher power output from generators of the same size or a reduced size if the same amount of power is required as heretofore.

The required degree of cooling may be obtained by suitable choice of the boiling point of the working medium, i.e., the heat-carrying medium within the heat pipe and by a suitable choice of the internal pressure, possibly sub-atmospheric pressure within the heat pipe. The invention permits a further adaptation to existing conditions by the free choice of the location of the heat exchange surfaces at the condensation region of a heat pipe. These surfaces can be made as large as necessary, especially if the air temperature is relatively high and the air speed low.

For example, if it is desired that the temperatures of the stator windings and of the power diodes not exceed 100° C., the heat transport fluid should have a relatively low boiling point, for example between 60° and 80° C., operating at a system pressure within the heat pipe of approximately 1 atmosphere. If sub-atmospheric system pressure is used in the heat pipe, a heat transfer medium with a correspondingly higher boiling point may be used.

Various modifications may be made to the above-described invention and features of one variant thereof may be used with others without thereby departing from the scope of the invention.

We claim:

1. In a d-c generator, particularly automotive alternator having
   a housing (1);
   a stator structure (2) having stator windings thereon located in the housing;
   a rotor structure (3) including a rotor shaft (4) rotatably positioned within the housing to rotate with respect to the stator;
   a heat pipe structure including
   heat pipe cooling means (11, 14, 15, 18, 21, 21b, 24, 24', 30, 34, 36) to cool the stator windings on the stator structure including means (11a, 14a, 15a, 18a, 21a, 24a, 24a', 30a, 34a, 36a) 36a', 41, 42, 41', 42') for forming an evaporation chamber and means (11b, 14b, 15b, 18b, 21d, 21f, 24b, 27, 30b, 33, 36b, 39, 39') for forming a condensation chamber in fluid communication with said evaporation chamber,
   and an evaporatable fluid contained in said chambers and wherein, in accordance with the invention,
   the evaporation chamber forming means (11a, 14a, 15a, 18a, 21a, 24a, 24a', 30a, 34a, 36a, 36a', 41, 42, 41', 42') are positioned adjacent the stator structure (2) and in heat transfer relation thereto;
   the condensation chamber forming means are secured externally of the housing and in a location at which the temperature is low with respect to that of the stator windings;
   a sequence of multiple and mutually communicating heat pipes is provided in communication with, and interconnecting said chambers;
   and said shaft (4) consists of a fan-less or ventilator wheel-less construction.

2. Generator according to claim 1, wherein said housing has a housing wall;
   wherein the evaporation chamber (15a) associated with the stator windings (2) is a cylindrical shell;
   wherein said condensation chamber (15b) is disposed in recesses within the housing wall; and external cooling fins (16, 20) secured in heat transfer relation to said condensation chamber.

3. Generator according to claim 2, wherein the cooling fins (16, 20) are attached to the outer wall of said housing wall.

4. Generator according to claim 1, wherein said condensation chamber (24b) forming means is a tube extending through and out of the wall (22') of the housing of said generator and is provided with cooling fins (25).

5. Generator according to claim 1, further comprising rectifier diodes (9) located on said generator;
   and wherein, in accordance with the invention,
   at least a portion of the evaporation chamber (14a, 30a, 34a, 36a', 42, 42') is positioned adjacent said diodes and in heat transfer relation thereto.

6. Generator according to claim 1, wherein mutually communicating heat pipes include intermediate tubing (21c) connecting the evaporation chamber (21a) and the condensation chamber (21b).

7. Generator according to claim 5, wherein said evaporation chamber is a hollow cylindrical shell (11a) or hollow annulus (14a) and said condensation chamber (11b, 14b) is a tube or cylindrical shell disposed outside of the housing; and cooling fins (12) secured to said tube or cylindrical shell.

8. Generator according to claim 5, wherein said evaporation chamber is shaped so as to substantially surround said stator windings and said diodes.

9. Generator according to claim 8, wherein said evaporation chamber (30a) is an annulus defining wells (32) for receiving said diodes (9); a transition tube (30c) connecting the evaporation chamber (30a) to the condensation chamber (30b, 33), said condensation chamber being secured in a spaced-apart manner with respect to the generator.

10. Generator according to claim 5, wherein said diodes (9) are mounted on a plate (10) in contact with the evaporation chamber (34a) of said heat pipe (34); and an insulating layer (35) separating said plate (10) and said evaporation chamber (34a).

11. Generator according to claim 5, wherein said heat pipe structure includes separate evaporation regions in in heat transfer relation with said stator windings and with said diodes respectively; and a common condensation chamber communicating with said separate evaporation regions.

12. Generator according to claim 1, wherein said a condensation chamber (27) is located substantially remote from said generator, and cooling fins (28) secured to said condensation chamber (27).

* * * * *